(12) United States Patent
Blunier

(10) Patent No.: US 10,542,656 B2
(45) Date of Patent: *Jan. 28, 2020

(54) REMOTE ELECTRICAL POSITIONING OF AN IMPLEMENT STABILIZER WHEEL

(71) Applicant: CNH Industrial America LLC, New Holland, PA (US)

(72) Inventor: Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 352 days.

This patent is subject to a terminal disclaimer.

(21) Appl. No.: 15/499,377

(22) Filed: Apr. 27, 2017

(65) Prior Publication Data
US 2018/0310459 A1    Nov. 1, 2018

(51) Int. Cl.
| | | |
|---|---|---|
| A01B 63/16 | (2006.01) |
| A01B 79/00 | (2006.01) |
| A01B 76/00 | (2006.01) |
| A01B 63/00 | (2006.01) |
| A01B 63/22 | (2006.01) |
| A01B 33/08 | (2006.01) |
| A01B 73/04 | (2006.01) |
| A01B 29/00 | (2006.01) |
| A01B 49/02 | (2006.01) |

(52) U.S. Cl.
CPC .......... *A01B 63/16* (2013.01); *A01B 33/087* (2013.01); *A01B 63/002* (2013.01); *A01B 63/22* (2013.01); *A01B 76/00* (2013.01); *A01B 79/005* (2013.01); A01B 29/00 (2013.01); A01B 49/027 (2013.01); A01B 73/044 (2013.01)

(58) Field of Classification Search
CPC ...... A01B 63/12; A01B 63/111; A01B 63/114; A01B 63/16; A01B 63/22; A01B 63/002; A01B 79/005; A01B 33/087
See application file for complete search history.

(56) References Cited

U.S. PATENT DOCUMENTS

| | | | |
|---|---|---|---|
| 2,918,300 A | * | 12/1959 | Hendrickson ............ A01B 3/46 16/18 A |
| 3,753,467 A | | 8/1973 | Wilson, II |
| 4,414,792 A | | 11/1983 | Bettencourt et al. |

(Continued)

FOREIGN PATENT DOCUMENTS

| | | |
|---|---|---|
| CN | 105570241 | 5/2016 |
| EP | 0078697 A2 | 5/1983 |

(Continued)

OTHER PUBLICATIONS

EP 8166587.8, Search Report dated Sep. 13, 2018, 9 pages.

*Primary Examiner* — Matthew Troutman
(74) *Attorney, Agent, or Firm* — Rebecca L. Henkel; Rickard K. DeMille

(57) ABSTRACT

A remotely positionable stabilizer wheel arrangement for a towable agricultural implement utilizes an electronic control unit that receives an input signal indicative of a desired position of the stabilizer wheel, and/or a desired depth of penetration of tillage tools operatively attached to the front and rear of the implement frame, to automatically control an electrically powered linear actuator of the remotely positionable stabilizer wheel arrangement to position and hold the stabilizer wheel at the desired position of the stabilizer wheel.

20 Claims, 8 Drawing Sheets

(56) References Cited

U.S. PATENT DOCUMENTS

| | | | |
|---|---|---|---|
| 5,086,847 A * | 2/1992 | Meiners | A01B 63/22 172/240 |
| 6,041,584 A | 3/2000 | Hohnl | |
| 6,119,786 A | 9/2000 | Creger et al. | |
| 6,684,962 B1 | 2/2004 | Lewallen | |
| D585,461 S * | 1/2009 | Kovach | D15/11 |
| 8,276,356 B2 | 10/2012 | Johannsen | |
| 8,291,997 B2 * | 10/2012 | Kovach | A01B 21/08 172/395 |
| 8,763,717 B2 | 7/2014 | Kovach et al. | |
| 8,827,001 B2 | 9/2014 | Wendte et al. | |
| 8,851,499 B1 | 10/2014 | Thompson | |
| 8,857,530 B2 | 10/2014 | Henry | |
| 8,909,436 B2 | 12/2014 | Achen et al. | |
| 9,307,688 B2 * | 4/2016 | Adams | A01C 7/203 |
| 9,389,214 B2 | 7/2016 | Adamchuk et al. | |
| 10,225,983 B2 * | 3/2019 | Kovach | A01D 67/005 |
| 2008/0110649 A1 | 5/2008 | Connell et al. | |
| 2010/0300340 A1 | 12/2010 | Harnetiaux | |
| 2011/0049263 A1 | 3/2011 | Vander Zaag et al. | |
| 2013/0112123 A1 | 5/2013 | Turko et al. | |
| 2014/0262370 A1 | 9/2014 | Kohn et al. | |
| 2015/0230391 A1 | 8/2015 | Houck | |
| 2015/0264857 A1 | 9/2015 | Achen et al. | |
| 2016/0050842 A1 | 2/2016 | Sauder et al. | |
| 2018/0092286 A1 * | 4/2018 | Anderson | A01B 63/16 |

FOREIGN PATENT DOCUMENTS

| | | |
|---|---|---|
| EP | 2192021 A2 | 6/2010 |
| EP | 2676533 | 12/2013 |
| JP | H09154302 | 6/1997 |

* cited by examiner

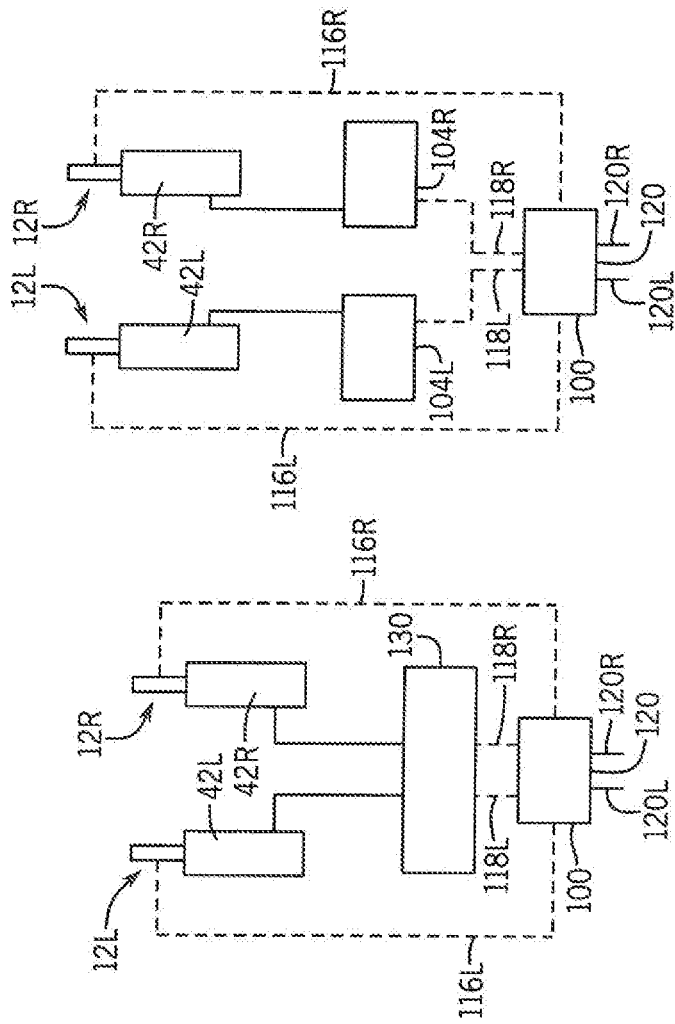
FIG. 13
FIG. 12
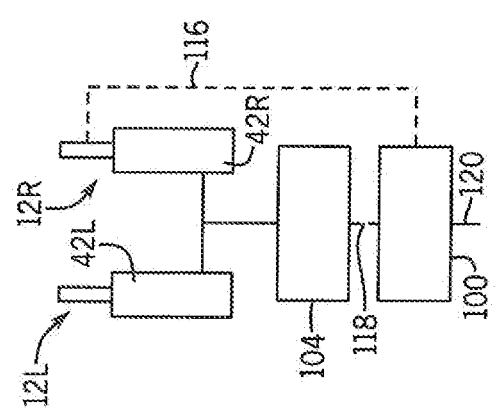
FIG. 11

REMOTE ELECTRICAL POSITIONING OF AN IMPLEMENT STABILIZER WHEEL

FIELD OF THE INVENTION

This invention relates generally to towable agricultural implements such as tillage equipment and other wide implements, towed behind a towing vehicle such as a tractor, and more specifically to stabilizer wheels utilized in such implements.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being tilled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on, or close to the ground surface, to damp any bouncing tendencies, and to provide additional support to preclude having the outer ends of the tillage tools dig too deeply into the ground surface during turning or maneuvering the wide tillage implement around obstacles during tillage operations.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks, by an operator or an operator's assistant standing on the ground. Alternatively, manually operated hydraulic cylinders have been used to position the stabilizer wheels on some tillage implements. Although hydraulic control cylinders provide advantages over manual turnbuckle approaches, hydraulic systems require bulky hoses, complex valves, and are prone to leakage. Furthermore, they tie up hydraulic circuits of the towing vehicle that could be better utilized for other purposes.

While these prior manual approaches have been successful in the past, they are cumbersome, undesirably time-consuming—particularly where an operator's assistant is needed—and, prone to adjustment error and fluid leakage. Further improvement is desirable.

It is especially desirable to provide an approach to positioning stabilizer wheels that can be carried out remotely by an operator seated in the towing vehicle, without the need for the operator to dismount from the towing vehicle, and without having an assistant on the ground. It is also desirable to provide an approach that allows the stabilizer wheels to be automatically, rather than manually, positioned in response to a simple command from an operator in the cab of the towing vehicle. It is further desirable that the stabilizer wheels be automatically adjusted in response to changes in depth of tillage. It is yet further desirable that an improved approach provide capability for remote, automatic and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position.

SUMMARY OF THE INVENTION

The invention provides a remotely positionable stabilizer wheel arrangement for a towable agricultural implement which utilizes an electronic control unit that receives an input signal indicative of a desired position of the stabilizer wheel, and/or a desired depth of penetration of tillage tools operatively attached to a frame of the implement, for automatically controlling an electrically powered linear actuator of the remotely positionable stabilizer wheel arrangement to position and hold the stabilizer wheel at the desired position of the stabilizer wheel.

One form of the invention provides a remotely positionable stabilizer wheel arrangement for an agricultural tillage implement having an implement frame supported above a ground surface by implement support wheels operatively connected to the frame by a depth control arrangement. The stabilizer wheel arrangement may include a support strut, a support strut bracket, a stabilizer wheel, an electrically powered linear actuator, an electric power source, a stabilizer wheel position sensor, and an electronic control unit.

The support strut may have a first end thereof adapted for mounting the stabilizer wheel to the support strut, with the stabilizer wheel being operatively attached to the first end of the strut in a manner that allows the stabilizer wheel to engage a ground surface to be tilled by the implement. The support strut bracket is adapted for attachment to the implement frame and for slidable engagement with a second end of the support strut, in a manner allowing the stabilizer wheel to operatively contact the ground surface. A first end of the electrically powered linear actuator may be operatively attached to the support strut, and a second end of the electrically powered linear actuator may be operatively attached to the support strut bracket, for extension and retraction of the strut with respect to the strut bracket by corresponding extension and retraction of the electrically powered linear actuator, to thereby lower and raise the stabilizer wheel in to and out of contact with the ground surface.

In some forms of the invention, the electrically powered linear actuator may include an internal position sensing function, or a present extension length of the actuator may be determined electronically by the electrical power source, thereby precluding the need for a separate position sensor.

The position sensor, of the remotely positionable stabilizer wheel arrangement, may alternatively be provided in a form external to the actuator and power source, that is operatively connected between the strut and the strut bracket for indicating a present linear position of the strut with respect to the strut bracket, and generating an electrical signal indicative of a present wheel position with respect to the strut bracket. The electric power source may be operatively connected to the electrically powered linear actuator for controlling extension and retraction of the electrically powered linear actuator in response to an actuator control electrical signal.

The electronic control unit, of the remotely positionable stabilizer wheel arrangement, may be operatively connected to the position sensor and the electric power source to receive the present position signal from the position sensor, and configured to receive a desired stabilizer wheel position input. The electronic control unit may be further configured for providing the electrically powered linear actuator control electrical signal to the electric power source, to thereby cause the electrically powered linear actuator to move the stabilizer wheel to, and hold the stabilizer wheel at the desired stabilizer wheel position.

In some forms of a remotely positionable stabilizer wheel arrangement, according to the invention, the control unit selects a predetermined stabilizer wheel position corresponding to the desired stabilizer wheel position input and controls the electric power source using the predetermined stabilizer wheel position. In other forms of the invention, the control unit may compute a computed desired stabilized wheel position corresponding to the desired stabilizer wheel position input and control the electric power source using the computed desired stabilizer wheel position. In some forms of the invention, the electronic control unit may be configured to control the stabilizer wheel in response to a desired stabilizer wheel position input signal calling for an incremental adjustment to a previous desired stabilizer wheel position.

In some forms of a remotely positionable stabilizer wheel arrangement, according to the invention, the electronic control unit may be yet further configured for receiving a desired depth electrical signal, computing a computed desired position of the stabilizer wheel, and providing e an actuator control signal corresponding to the computed desired position of the stabilized wheel to the electric power unit, to thereby cause the electrically powered linear actuator to move the stabilizer wheel to, and hold the stabilizer wheel at the computed desired stabilizer wheel position. The electronic control unit may be configured to select a predetermined stabilizer wheel position corresponding to the desired depth electrical signal, and controlling the electric power source using the selected predetermined stabilizer wheel position. In some forms of the invention the control unit may compute a computed desired stabilized wheel position corresponding to the desired depth input and control the electric power source using the computed desired stabilizer wheel position. The desired depth input may be an incremental adjustment to a previous desired depth of penetration, in some forms of the invention.

In some forms of a remotely positionable stabilizer wheel arrangement, according to the invention, the first end of the stabilizer wheel strut may include a pivot bracket for operatively connecting the stabilizer wheel to the strut, with the pivot bracket defining a substantially horizontally extending rolling axis of the stabilizer wheel, and also defining a non-horizontal pivot axis of the stabilizer wheel, such that the stabilizer wheel can simultaneously rotate about the rolling axis and pivot about the pivot axis.

The invention may also take the form of a towable agricultural tillage implement adapted for attachment to a towing vehicle, and having one or more remotely positionable stabilizer wheel arrangements, according to the invention. Such an implement may include a frame supported above a ground surface by implement support wheels operatively connected to the frame by a depth control arrangement, to thereby control a depth of penetration below the ground surface of tillage tools attached to the frame, and one or more stabilizer wheel arrangements, according to the invention, attached to the frame in a manner providing selective stabilizing support of the implement.

Each of the one or more remotely positionable stabilizer wheel arrangements, in a towable tillage implement according to the invention, may take any of the forms described above, with respect to aspects of the invention in the form of a remotely positionable stabilizer wheel arrangement according to the invention.

In forms of an implement according to the invention, having a plurality of stabilizer wheel arrangements attached to the frame, one or more of the plurality of remotely positionable stabilizer wheel arrangements may be operatively connected to a common electronic control unit to be collectively controlled thereby. In forms of an implement, having a plurality of stabilizer wheel arrangements attached to the frame, according to the invention, one or more of the plurality of stabilizer wheel arrangements may be operatively connected to a common electronic control unit to be individually controlled by the common electronic control unit.

In forms of an implement, according to the invention, having a plurality of stabilizer wheel arrangements attached to the frame, one or more of the plurality of stabilizer wheel arrangements attached to the frame may be operatively connected to a common electronic control unit and a common electric power source to be collectively controlled by the common electronic control unit and the common electric power source.

The invention may also take the form of a method for remotely positioning a stabilizer wheel arrangement according to the invention, in an agricultural tillage implement according to the invention. Such a method may include the steps of: operatively attaching a first end of an electrically powered linear actuator to the support strut, and a second end of the electrically powered linear actuator to the support strut bracket for extension and retraction of the strut with respect to the strut bracket by corresponding extension and retraction of the electrically powered linear actuator to thereby lower and raise the stabilizer wheel in to, and out of contact with the ground surface; operatively connecting a position sensor between the strut and the strut bracket for indicating a present linear position of the strut with respect to the strut bracket, and generating an electrical signal indicative of a present stabilizer wheel position with respect to the strut bracket; operatively connecting an electric power source to the electrically powered linear actuator for controlling extension and retraction of the electrically powered linear actuator in response to an actuator control electrical signal; and operatively connecting an electronic control unit to the position sensor and the electric power source to receive the present position signal and a desired stabilizer wheel position input, and to provide the electrically powered linear actuator control electrical signal to the electric power source, to thereby cause the electrically powered linear actuator to move the stabilizer wheel to, and hold the stabilizer wheel at the desired stabilizer wheel position.

In some forms of a method according to the invention, where the implement includes a plurality of remotely positionable stabilizer wheel arrangements attached to the frame, and the method may further include, operatively connecting the plurality of stabilizer wheel arrangements to a common electronic control unit to be collectively controlled by the common electronic control unit. In other forms of a method according to the invention, where the implement includes a plurality of remotely positionable stabilizer wheel arrangements attached to the frame, the method may include, operatively connecting the plurality of stabilizer wheel arrangements to a common electronic control unit, and collectively controlling the plurality of remotely positionable stabilizer wheel arrangements with the common electronic control unit.

In some forms of the invention, the electronic control unit may be remotely mounted within the towing vehicle, and may utilize an ISOBUS, a touch screen in the towing vehicle cab, or such other standard communication and control devices and protocols as are available in the agricultural arts.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the invention. In the drawings:

FIG. 11 is a schematic representation of an exemplary embodiment of the invention having a pair of remotely positionable stabilizer wheel arrangements controlled collectively by a common electronic control unit and a common electric power source;

FIG. 12 is a schematic representation of an exemplary embodiment of the invention having a pair of remotely positionable stabilizer wheel arrangements controlled individually by a common electronic control unit and a pair of individual electric power sources; and FIG. 13 is a schematic representation of an exemplary embodiment of the invention having a pair of remotely positionable stabilizer wheel arrangements controlled individually by a common electronic control unit and a common electric power source.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
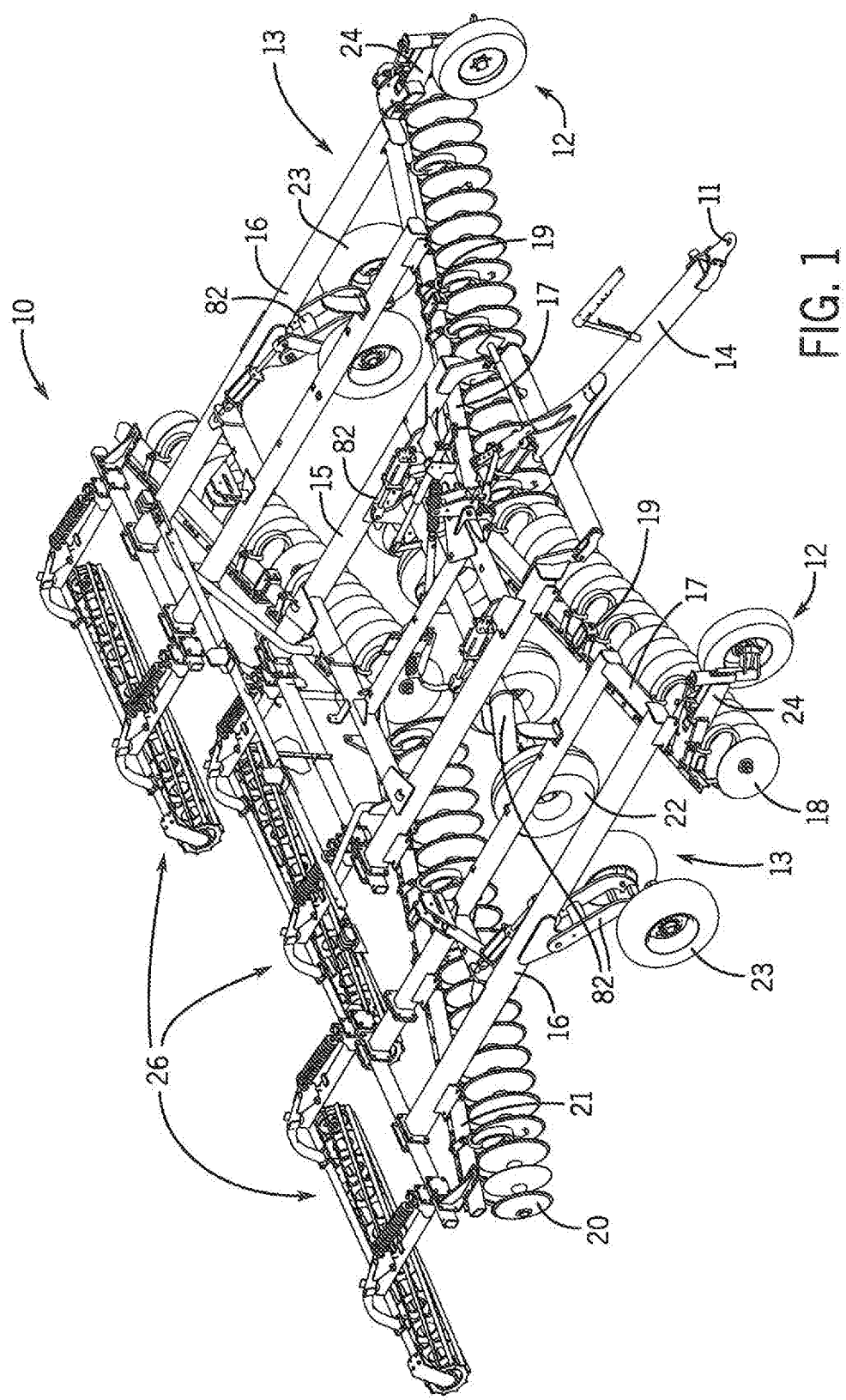
FIG. 1 is an isometric view of a towable agricultural tillage implement, according to the invention.

FIG. 1 shows an exemplary embodiment of a towable agricultural implement, according to the invention, in the form of a tandem disk 10, including a pair of left and right remotely adjustable stabilizer wheel arrangements 12,12. The disk 10 includes a hitch 14, which has a distal end 11 that is adapted for operative attachment to a towing vehicle, such as a tractor. The disk 10 has a frame 16 that includes a pair of left and right floating wings 13,13 connected to a central main section 15 of the frame 16 by a plurality of hinged joints 19. The disk 10 also includes segmented front and rear tillage tools, in the form of front and rear disk gangs 18, 20, that are operatively joined to the frame 16 by front and rear segmented tool bars 17,21 respectively. The tool bars 17,21 and disk gangs 18,20 are segmented and attached to the main frame 16 and wing frames 13,13 in a manner that allows the wing frames 13,13 and the segments of the front and rear disk gangs 18,20 to be folded above the center section 15 of the frame 16, to thereby narrow the disk 10 for transport on public roadways.

Figure 2:
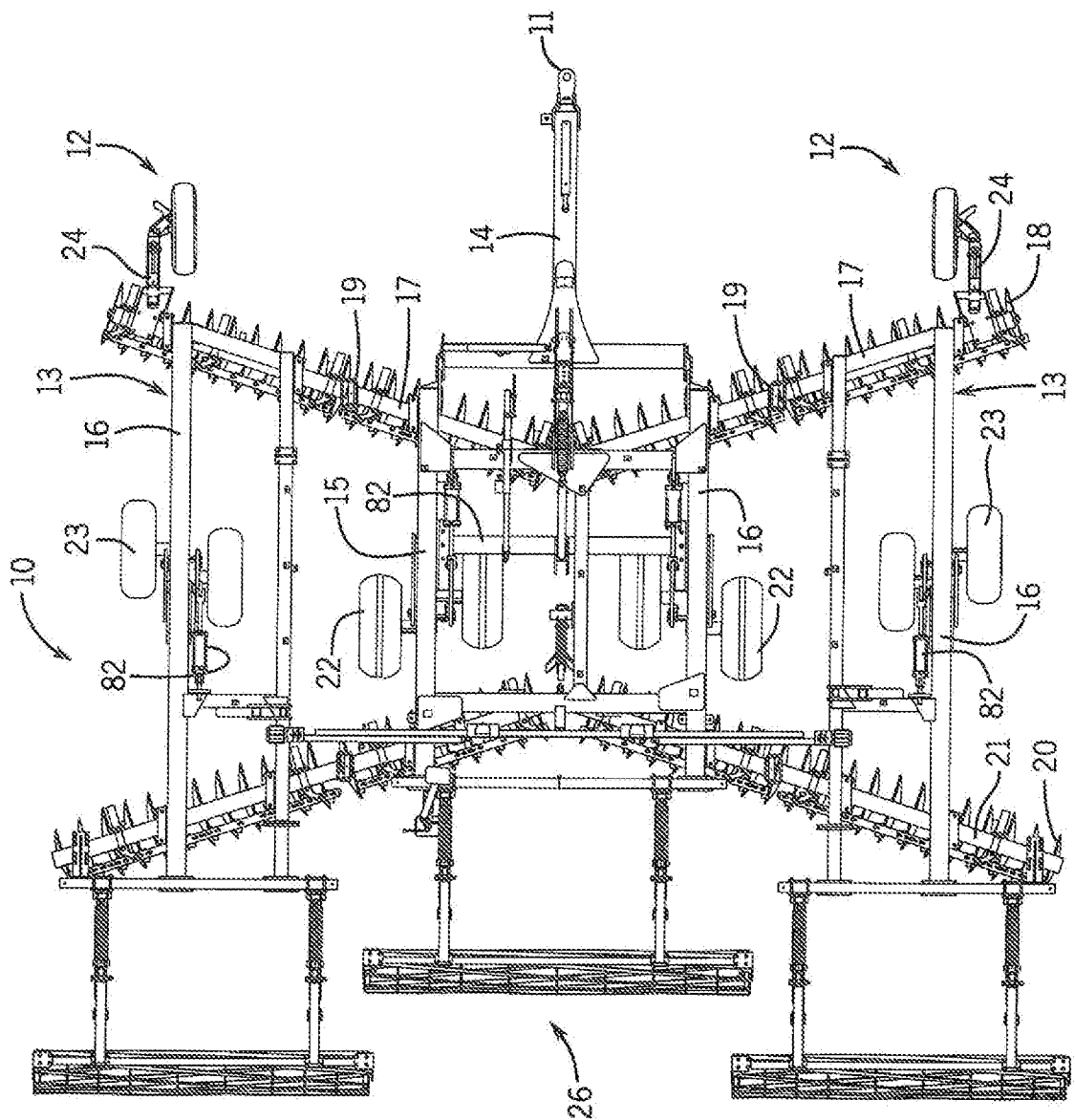
FIG. 2 is an orthographic top view of the exemplary embodiment of the implement of FIG. 1.
Figure 3:
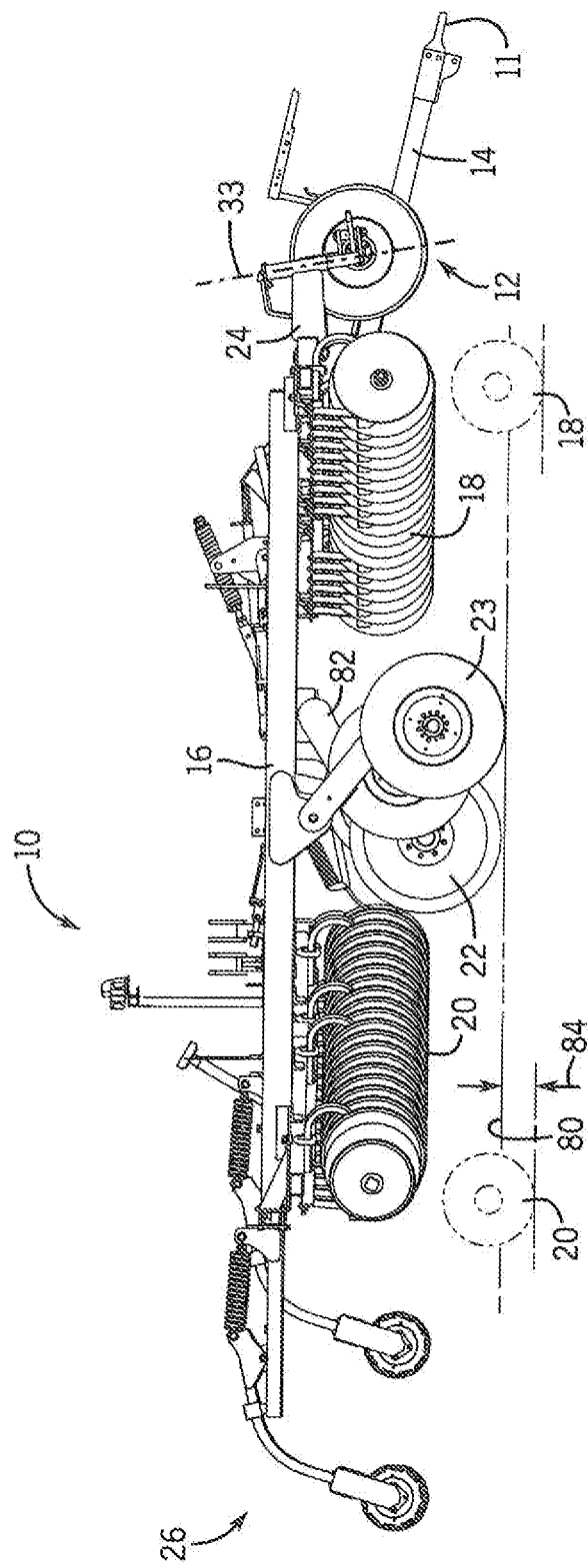
FIG. 3 is an orthographic side view of the exemplary embodiment of the implement of FIG. 1, showing the implement in a raised position for field transport, with stabilizer wheels and tillage tools of the implement raised off of the ground.

As shown in FIGS. 1-3, the disk 10 is supported above a ground surface 80 by two pairs of tandem support wheels 22,22, and right and left pairs of wing frame support wheels 23,23. The pairs of support and wing frame wheels 22,22, 23,23 are all operatively attached to the main frame 15 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13 are lowered, as shown in FIGS. 1-3, the support wheels 22,22 and wing frame wheels 23,23 all act together to support the disk 10 above the ground surface 80. In FIG. 3, the disk 10 is shown in a raised, field transport condition, where the wheels 22,22,23,23 and depth control arrangement 82 have lifted the disk gangs 18,20 out of contact with the ground surface 80. When the wing frames 13 are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13,13 are raised above the main frame 15 to narrow the disk 10 for towing on a public roadway, a part of the depth control arrangement 82 attaching the transport wheels 22,22 to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form rotating crumblers 26 operatively attached to the rear of the disk 10.

As best seen in FIGS. 1 and 2, the disk 10 includes two remotely adjustable left and right stabilizer wheel arrangements 12,12 which are respectively located near the left and right front extremities of front tool bar 17. In various embodiments of the invention, the stabilizer wheel arrangements 12,12 may be operatively attached directly to the main frame 15 or wing frames 13 of the frame 16, or alternatively attached to the front tool bar 17

As discussed above, the main frame 15 and wing frames 13,13 are joined together by a plurality of hinged connections 19, that allow the wing frames 13,13 to be folded above the main frame 15. The disk 10 is further configured to utilize these hinged connections 19 in a manner that allows the wing frames 13,13 to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13,13 to bounce, under certain tillage conditions, and also contribute to the outer corners of the front disk gangs 18,20 undesirably digging too deeply into the ground surface 80, during turning or maneuvering the disk 10 around an obstacle. Accordingly, the remotely positionable stabilizer wheel arrangements 12,12 of the exemplary embodiment of the disk 10 are advantageously attached to the wing frames 13,13, or the front tool bar 17 near the front left and right front corners of the disk 10. Positioning the remotely positionable stabilizer wheel arrangements 12,12 in this manner maximizes their effectiveness in damping out wing bounce and/or undesirable digging-in of the front disk gang 18.

The stabilizer wheel arrangements 12,12 are properly adjusted to maintain only light contact pressure with the ground surface 80, until they come into operation due to a change in the terrain, so as to not interfere with operation of the depth control arrangement 82 and support and transport wheels 23,23,22,22 in maintaining a desired depth of penetration 84 of the front and rear disk gangs 18,20 below the ground surface 80.

FIGS. 4-9 illustrate an exemplary embodiment of the remotely electrically positionable stabilizer wheels 12, 12, of the exemplary embodiment of the disk 10. The left and right remotely positionable stabilizer wheel arrangements 12,12 of the exemplary embodiments described herein are left and right hand assemblies of identical groupings of component parts, which will be described in more detail below.

Figure 5:
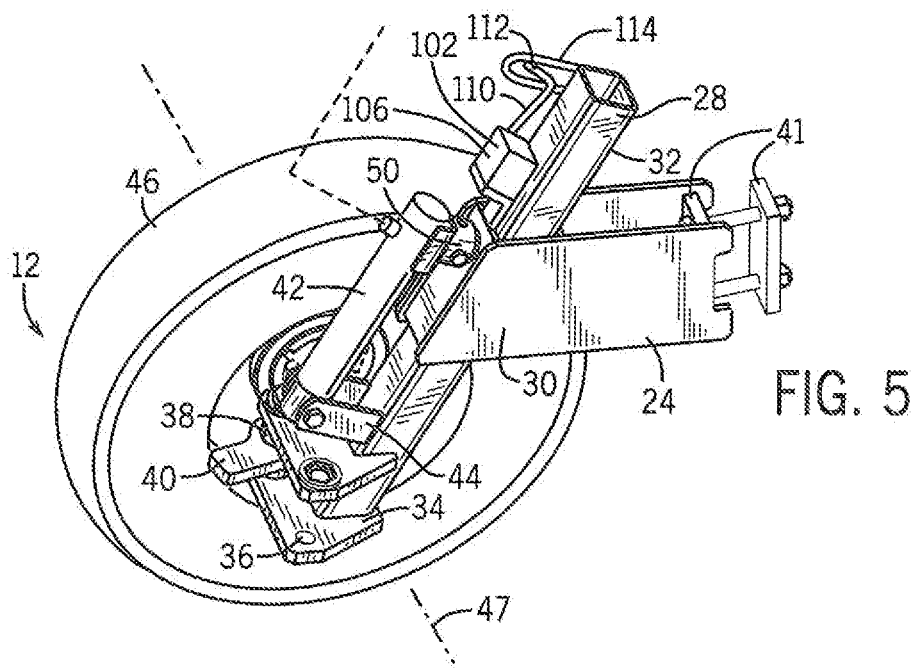
FIG. 5 is an isometric view of an alternate embodiment of a portion of the exemplary embodiment of a remotely positionable stabilizer wheel arrangement of FIG. 4, wherein a position sensor is located internally to the electrically powered linear actuator.
Figure 4:
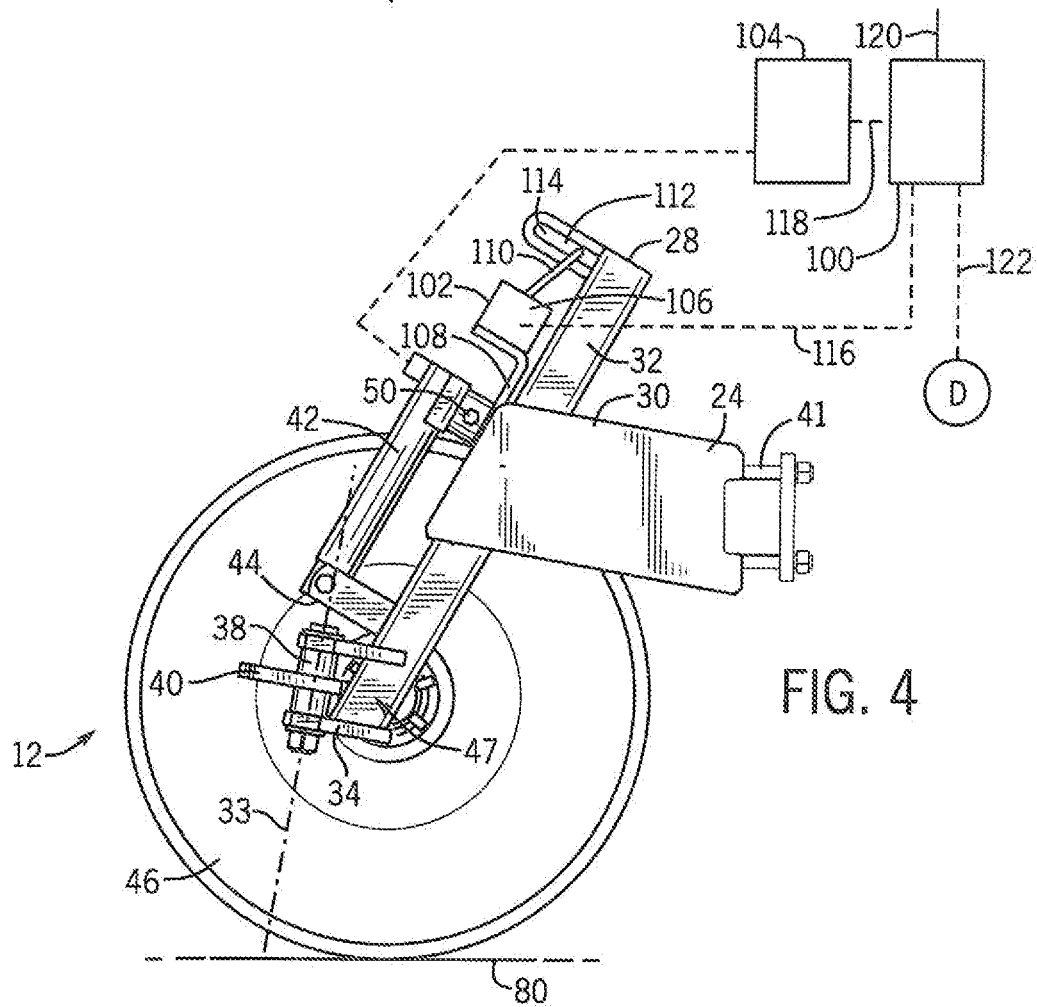
FIG. 4 is a partly schematic orthographic side view of an exemplary embodiment of a left remotely positionable stabilizer wheel arrangement, having an external position sensor, as viewed from the left front corner of exemplary embodiment of the implement of FIG. 1, with a hitch of the implement for attachment to a towing vehicle defining the front of the implement, and left and right sides of the implement being as viewed by a person standing at the rear of the implement looking forward toward the hitch.

FIGS. 4 and 5 show the left front remotely positionable stabilizer wheel arrangement 12 of the disk 10. The exemplary embodiment of the remotely positionable stabilizer wheel arrangement 12 includes a support strut 28, a support strut bracket 24, a stabilizer wheel 46, an electrically powered linear actuator 42, an electric power source 104, a stabilizer wheel position sensor 102, and an electronic control unit 100.

It is contemplated that the electrically powered linear actuator 42, position sensor 102, electric power source 104, and the electronic control unit 100 may take a variety of forms in practicing the invention. For example, the electrically powered linear actuator 42 may take the form of an electric motor driven ball screw. In the embodiment of FIG. 5, the position sensor 106 is located inside of the electrically powered linear actuator 42. In the embodiment shown in FIG. 4, the position sensor 102 is external to the electrically powered linear actuator 42, and is operatively mounted and connected in the manner described below. In other embodiments of the invention, it is contemplated that the functionality of the position sensor 106 may be provided by interaction of the electric power source 104, and/or the electronic control unit 100, in conjunction with signals fed to and from the electrically powered linear actuator 42.

The support strut 28 has a first, lower, end 34 thereof adapted for mounting the stabilizer wheel 46 to the support strut 28 in a manner that allows the stabilizer wheel 46 to roll about a substantially horizontal rotational axis 47 when the stabilizer wheel 46 is in contact with the ground surface 80. As will be described in more detail below, the lower end of the support strut 28 is configured to form a pivot bracket 34, and connected to the stabilizer wheel 46 in a manner that allows the wheel 46 to pivot to a limited about a pivot axis 33 that extends in a generally up and down, non-horizontal direction, to thereby facilitate maneuverability of the disk 10.

The support strut bracket 24 has a first end 41 thereof adapted for attachment to the implement frame 16, or the front tool bar 17. In the embodiments shown in FIGS. 4-5 and 8-9, the first end 41 of the support strut bracket is configured as a bolt-on clamping arrangement. In other embodiments, the first end 41 of the support strut bracket may be configured for attachment by any appropriate method, such as a through a bolting flange or by welding. The second, distal, end 30 of the support strut bracket 24 is configured for slidable engagement with a second end 32 of the support strut 28, in a manner allowing the stabilizer wheel 46 to alternatively be lowered into contact the ground surface 80, or raised out of contact with the ground surface 80.

A first, lower, end of the electrically powered linear actuator 42 is operatively attached to a pair of ears 44 of the pivot bracket 34 at the lower end of the support strut 28 by a pivoting pin or bolted connection. The other, upper, end thereof of the electrically powered linear actuator 42 is operatively attached through a pivotable pinned or bolted connection to a second pair of ears 50 fixedly attached to the second end 30 of the support strut bracket 24. By virtue of this arrangement, the support strut 28 can be extended or retracted with respect to the strut bracket 24 by corresponding extension and retraction of the electrically powered linear actuator 42, to thereby respectively lower and raise the stabilizer wheel 46 in to, and out of contact with the ground surface 80.

In the embodiment shown in FIG. 4, the position sensor 102, of the remotely positionable stabilizer wheel arrangement 12 is operatively connected between the strut 28 and the strut bracket 24 for indicating a present linear position of the strut 28 with respect to the strut bracket 24, and generating an electrical signal 116 that is indicative of a present position of the stabilizer wheel 46 with respect to the strut bracket 24. In the embodiment shown in FIG. 4, the position sensor 102 is a rotary potentiometer, having a body 106 attached to a sensor mounting bracket 108 that extends upward from and is fixedly attached to the second end 30 of the support strut bracket 24. The rotary potentiometer 102 has a rotatable arm 110 thereof, that slidingly engages an elongated slot 112 in a guide bracket 114 that is affixed to the upper end 32 of the strut 28, in such a manner that linear movement of the strut 28 with respect to the strut bracket 24 is translated into rotation of the arm 110 of the potentiometer 102 with respect to the body of potentiometer 102, to thereby cause the potentiometer 102 to generate the electrical signal 116 indicating a present position of the stabilizer wheel 46 with respect to the strut bracket 24.

It will be appreciated that once the present position of the stabilizer wheel 46 with respect to the strut bracket 24 is known, it is a matter of straightforward geometrical calculation, using the dimensions of the disk 10 and the current depth of penetration being held by the depth control arrangement 82, to also determine contact, or lack of contact, of the stabilizer wheel 46 with the ground surface 80. It will also be appreciated that, in other embodiments of the invention, the position sensor may take a variety of different forms, and utilize sensing elements other than a rotary potentiometer. For example, it is contemplated that other embodiments of the invention may utilize some form of a linear position sensor operatively connected between the strut 28 and the strut bracket 24, or a Hall-effect or other type of electrical position sensor built into the electrically powered linear actuator 42 to provide a signal indicative of the present position of the stabilizer wheel 46.

As illustrated schematically in FIG. 4, the electric power source 104 is operatively connected to the electrically powered linear actuator 42 for controlling extension and retraction of the electrically powered linear actuator 42 in response to an electrically powered linear actuator control electrical signal 118 received from the electronic control unit 100. It is contemplated that the electric power source 104 may take the form of any suitable electrically controlled source of electric power, available as a part of the disk 10 or in the towing vehicle.

As further illustrated schematically in FIG. 4, the electronic control unit 100, of the remotely positionable stabilizer wheel arrangement 12, is further operatively connected to the position sensor 102 to receive the present stabilizer wheel position signal 116 from the position sensor 102. As further illustrated schematically in FIG. 4, the electronic control unit 100 is configured to also receive a desired stabilizer wheel position input 120 from an external source, such as an operator of the towing vehicle. The electronic control unit 100 is internally configured for providing the electrically powered linear actuator control electrical signal 118 to the electric power source 104, to thereby cause the electrically powered linear actuator 42 to move the stabilizer wheel 46 to, and hold the stabilizer wheel 46 at a present stabilizer wheel position, as indicated by the position signal 116 generated by the position sensor 102, that is equal to the desired stabilizer wheel position input 120 received from the external source.

In some forms of a remotely positionable stabilizer wheel arrangement 12, according to the invention, the control unit 100 selects a predetermined stabilizer wheel position, stored in memory of the control unit 100, corresponding to the desired stabilizer wheel position input 120 and controls the electric power source 104 using the predetermined stabilizer wheel position. In other forms of the invention, the control unit 100 may calculate a computed desired stabilized wheel position corresponding to the desired stabilizer wheel position input 120, and control the electric power source 104 using the computed desired stabilizer wheel position. For example, where the control input 120 calls for desired extension of 24 inches of the stabilizer wheel 46 with respect to the strut bracket 24, the electronic control unit will either look up a desired extension position signal 116 stored in memory, or calculate a desired present position signal 116, and then issue appropriate commands 118 to the electric power source 104 to cause the electrically powered linear actuator 42 to drive the stabilizer wheel 46 to, and hold the stabilizer wheel 46 at a position of 24 inches, where at the present position signal 116 matches the desired position signal 120. If a new desired position input of 23 inches is provided, the above processes would be repeated to position the stabilizer wheel 46 at the new position desired present position of 23 inches.

In some forms of the invention, the electronic control unit may be configured to position the stabilizer wheel 46 in response to a desired stabilizer wheel position input signal 120 calling for an incremental adjustment to a previous desired stabilizer wheel position. For example, where the remotely positionable stabilizer wheel 46 is currently operating at extension distance of 24 inches from the strut bracket 24, the input signal 120 may call for the extension distance to be increased by ½ inch from the present position, causing the electronic control unit 100 to calculate a new desired extension position of the stabilizer wheel at 24½ inches from the strut bracket 24, and control the electric power source 104 to drive the stabilizer wheel 46 to, and hold the stabilizer wheel 46 at an extension of 24½ inches.

As illustrated schematically in FIG. 4, in some forms of a remotely positionable stabilizer wheel arrangement 12, according to the invention, the electronic control unit 100 may be yet further configured for receiving a desired depth electrical signal 122 and computing a computed desired position of the stabilizer wheel 46, and for providing an actuator control signal 118 corresponding to the computed desired position of the stabilized wheel to the electric power source 104, to thereby cause the electrically powered linear actuator 42 to move the stabilizer wheel 46 to, and hold the stabilizer wheel 46 at the computed desired stabilizer wheel position. The electronic control unit 100 may be configured for selecting a predetermined stabilizer wheel position corresponding to the desired depth electrical signal 122, and controlling the electric power source 104 using the selected predetermined stabilizer wheel position. In some forms of the invention the control unit 100 may calculate a computed desired stabilizer wheel position corresponding to the desired depth input 122, and control the electric power source 104 using the computed desired stabilizer wheel position. The desired depth input 122 may indicate the desire to make an incremental adjustment to a previous desired depth of penetration 84, in some embodiments of the invention.

In embodiments of the invention utilizing a desired depth signal 122, it is contemplated that the desired depth signal may be an input from a source, such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, the left and right remotely positionable stabilizer wheel arrangements 12,12, according to the invention, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figure 6:
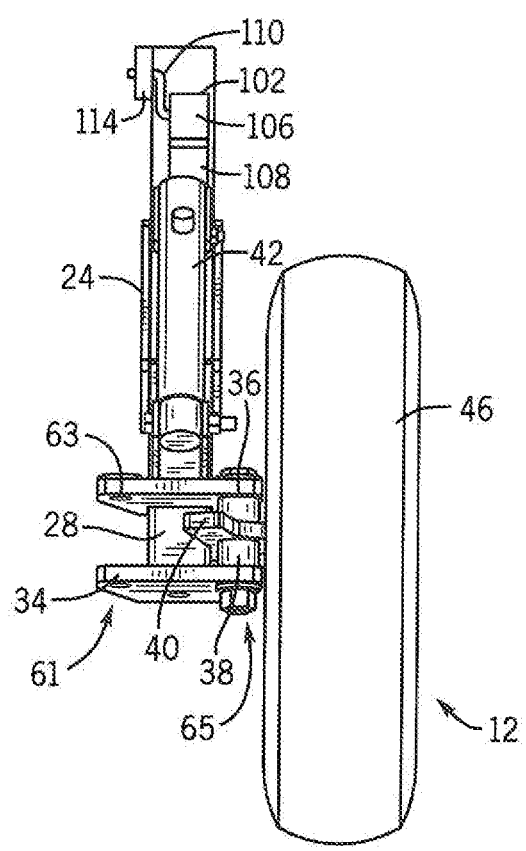
FIGS. 6 and 7 respectively, are enlarged front orthographic views of left and right remotely positionable stabilizer wheels of the implement of FIG. 1.
Figure 7:
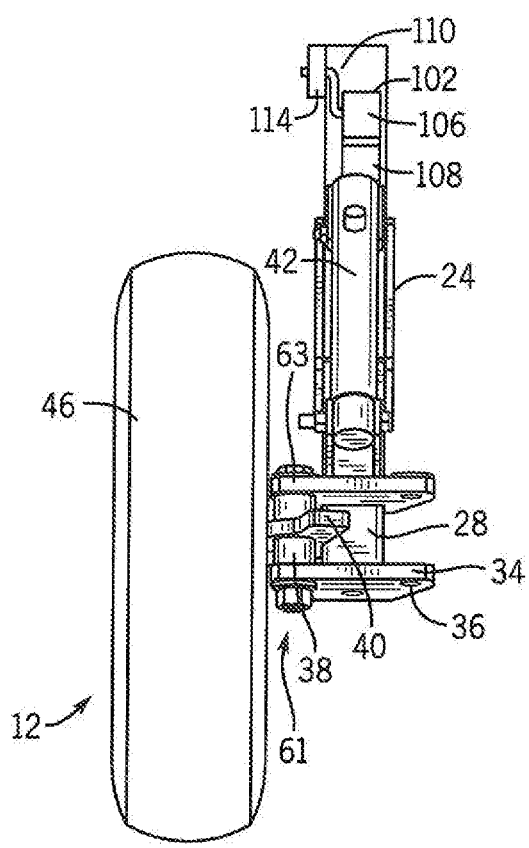
Figure 8:
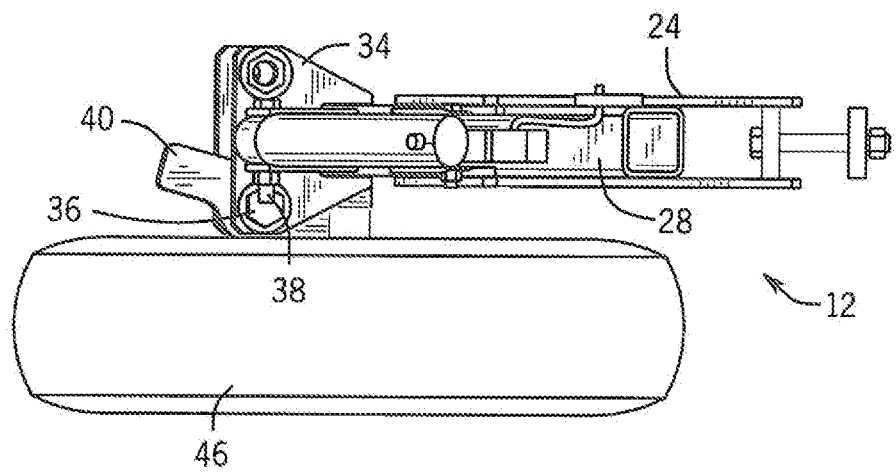
FIGS. 8 and 9 respectively, are enlarged top orthographic views of left and right remotely positionable stabilizer wheels of the implement of FIG. 1.
Figure 9:
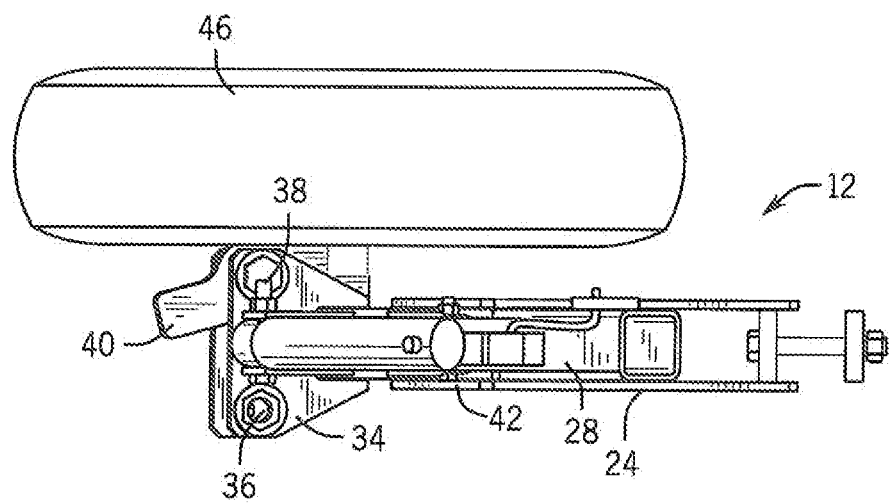

As shown in FIGS. 4-10, the pivot bracket 34 of the exemplary embodiments is part of a reversible and interchangeable pivot assembly 38 that allows components of the pivot assembly to be assembled in either a left-hand configuration, as shown in FIGS. 4-6, or in a right-hand configuration, as shown in FIG. 7.

As shown in FIGS. 6-10, the pivot bracket 34 includes holes 36 that allow the pivot assembly 38 to be placed on either side of the pivot bracket 34. The pivot assembly 38 also includes pivot stop 40 that is configured to contact the pivot bracket 34 at a predetermined pivot angel of the stabilizer wheel 49 about the pivot axis 33, to thereby limit the pivoting movement of the stabilizer wheel 46 about the pivot axis 33. The pivot stop 40 of the exemplary embodiment is configured as an outwardly extending tang, which contacts the lower end 34 of the strut 28 in a manner that sets essentially a one-way pivoting angular limit on the stabilizer wheel 46.

FIGS. 6 and 7 illustrate front views of the left and right remotely positionable stabilizer wheel arrangements 12,12, respectively of the exemplary embodiment of the disk 10, with left and right being determined from the point of view of a person standing behind the disk 10 and looking toward the hitch 14. As will be appreciated by one skilled in the art, from examination for FIGS. 4-10, the same components are used for both the left and right stabilizer wheel arrangements 12 of the exemplary embodiment of the disk 10. Configuring the stabilizer wheel arrangement for operation on one side or the other of the disk 10 is simply a matter of positioning the wheel 46, pivot assembly 38 and pivot stop 40 on the appropriate side of the bracket 34.

Figure 10:
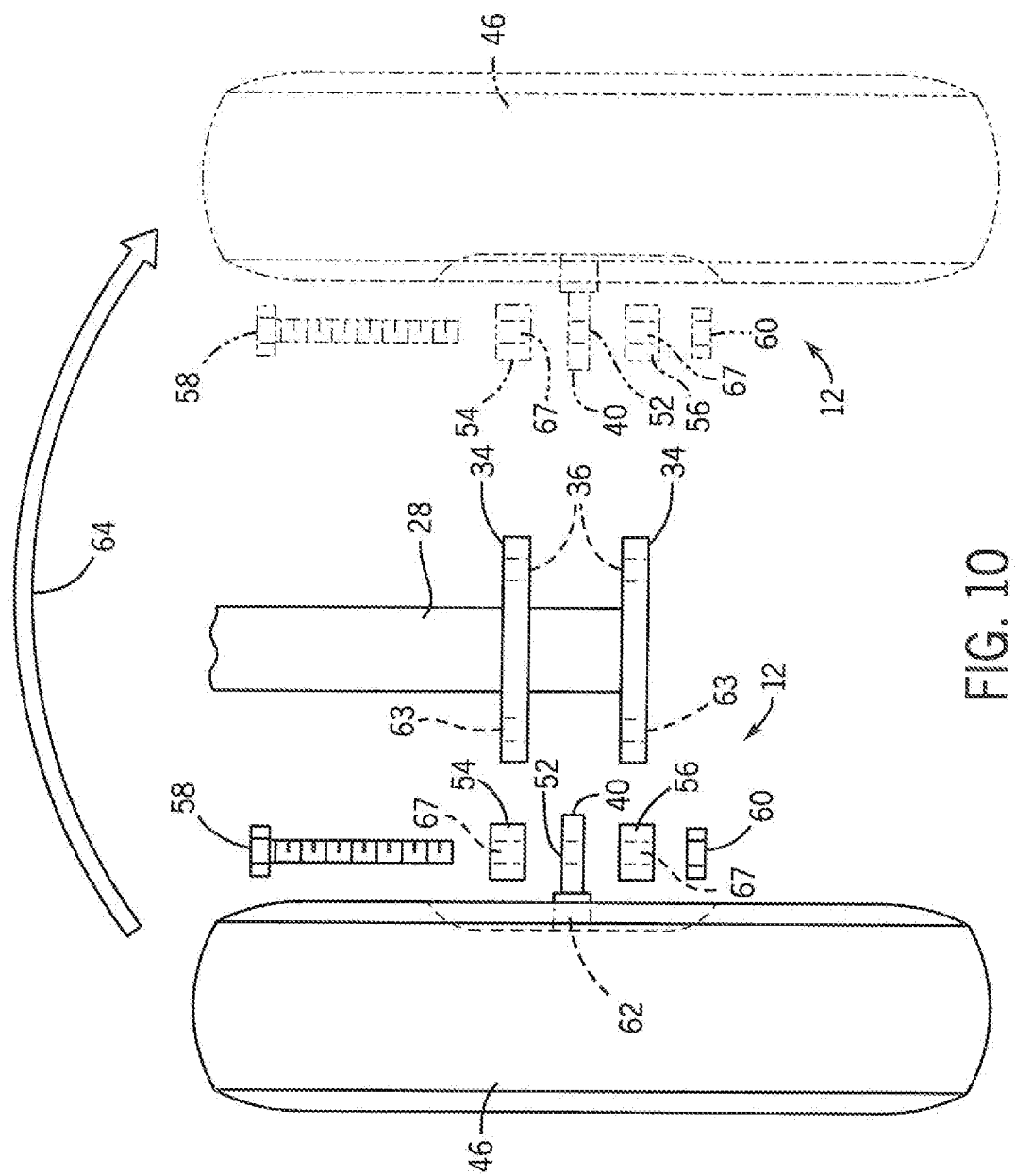
FIG. 10 is an illustration of the manner in which a remotely positionable stabilizer wheel arrangement, according to the invention, may be alternatively configured for use on either a left or a right side of the implement of FIG. 1.

FIG. 10 illustrates the orientation of the components of an embodiment of a stabilizer wheel arrangement 12 to properly configure the stabilizer wheel arrangement 12 for placement on one side or the other of an implement. The pivot stop 40 includes an upper surface 52, and a hole 36 that is aligned with holes 67 in spacers 54 and 56 for the placement of bolt 58. The assembled configuration may include bolt 58 inserted through pivot bracket holes 36, spacers 54 and 56, and pivot stop 40 with nut 60 securing the end of the bolt 58 against the bottom of pivot bracket 34. In the embodiment, the pivot stop 40 is a flat plate that may be described as a tang that protrudes from a wheel bearing assembly 62. Bearing assembly 62 is a mechanism that permits pivotal movement of the stabilizer wheel 12. Arrow 64 shows the alternative configuration for stabilizer wheel assembly 12, with bolt 58, spacers 54 and 56 and pivot stop 40 located on the opposite side of pivot bracket 34. It should be noted that the present configuration illustrates that pivot stop 40 is flipped 180 degrees for attachment to the other side of pivot bracket 34. That is, upper surface 52 is actually facing "downward" in the second configuration, as shown by the hidden lines. The configuration of pivot stop 40 is such that it may be used on either side of the pivot bracket 34 as long as the wheel 46 is rotated 180 degrees in a vertical plane, as generally indicated by arrow 64.

For economy of construction and operation, it is contemplated that in forms of an implement 10, according to the invention, having a plurality of stabilizer wheel arrangements 12 attached to the frame 16, components of one or more of the plurality of remotely positionable stabilizer wheel arrangements 12 may be operatively connected to a common electronic control unit 100, to be collectively or individually controlled thereby. FIGS. 11-13 schematically illustrate several alternate embodiments of the invention having a single electronic control unit 100, configured for operating a pair of left and right remotely positionable stabilizer wheels, according to the invention. It will be understood, however, that embodiments of the invention utilizing a single electronic control unit 100 for controlling a plurality of remotely positionable stabilizer wheels, other than those described below in relation to FIGS. 11-13, are contemplated within the scope of the invention.

FIG. 11 shows an alternate embodiment of the invention having a single, common electronic control unit 100 and a single, common electric power source 104 controlling the electrically powered linear actuators 42L,42R of a pair of remotely positionable stabilizer wheel arrangements 12L, 12R. The electrically powered linear actuators 42L,42R are connected with one another and the electric power source 104, in such a manner that the left and right electrically powered linear actuators 42L,42R are collectively controlled by the common electric power source 104 in response to a single stabilizer wheel control signal 118 generated by the common electronic control unit 100, in response to a single desired stabilizer wheel position input signal 120.

Those having skill in the art will appreciate that the essentially "fixed displacement" nature of certain types of electrically powered linear actuators 42, such as an electric motor driven ballscrew, make such a configuration possible. Once the linear actuators are initially set a common extension, they will stay in sync with one another as they are driven the same number of turns by the electric power unit 104. This "fixed displacement" nature of electrically powered linear actuators, such as ballscrews, provides an advantage over variable displacement fluid-powered actuators that would need to utilize cumbersome plumbing or other more complex control arrangements to endure that the stabilizer wheels 46L,46R stayed in sync with one another at the same extension position.

In the embodiment shown in FIG. 11, further economy is achieved by utilizing only a single stabilizer wheel position sensor (not shown) operatively attached to the stabilizer wheel of the right remotely positionable stabilizer wheel arrangement 12R and providing an electrical signal 116 that is indicative of the position of the right stabilizer wheel to the common electronic control unit 100. Because the left and right electrically powered linear actuators 42L,42R inherently stay in sync due to their fixed displacement nature, the common electronic control unit 100 and electric power source 104 will drive the left and right stabilizer wheels collectively to the same extension position.

FIG. 12 shows another alternate embodiment of the invention having a single, common electronic control unit 100 operatively connected to a pair of separate left and right electric power sources 104L,104R respectively, individually controlling the electrically powered linear actuators 421,42R of a pair of remotely positionable stabilizer wheel arrangements 12L, 12R. The electrically powered linear actuators 42L,42R are connected separately from one another, to their respective left and right electric power sources 104L,104R, in such a manner that the left and right electrically powered linear actuators 42L,42R are individually controlled by their respective left and right electric power source 104L, 104R in response to a pair of left and right stabilizer wheel control signals 118L, 118R generated by the common electronic control unit 100 in response to a single desired stabilizer wheel position input signal 120. In the embodiment shown in FIG. 12, the common electronic control unit 100 receives separate inputs 161L,116R from both, the left and right stabilizer wheel position sensors (not shown) that are indicative of the individual positions of the left and right stabilizer wheels. The common electronic control unit 100 is configured to provide separate left and right stabilizer wheel control signals 118L,118R to the left and right electric power sources 104L,104R, to thereby individually position the stabilizer wheels of the left and right remotely positionable stabilizer wheel arrangements.

FIG. 12 also illustrates a variation of the above described alternate embodiment, in which the common electronic control unit 100 receives separate left and right desired stabilizer wheel position inputs 120L,120R, and controls the left electric power source and electrically powered linear actuator 104L,42L completely separately and individually front the right electric power source and electrically powered linear actuator 104R,42R.

FIG. 13 shows a schematic illustration of yet another alternate embodiment of the invention, in which a single electronic control unit 100 is utilized with a single electric power source 130 to individually control the electrically powered linear actuators 42L,42R of a pair of left and right remotely positionable stabilizer wheel arrangements 12L, 12R, according to the invention. It will be appreciated that the structure and operation of the alternate embodiment of FIG. 13 is essentially identical to the structure and operation of the embodiments described above in relation to FIG. 12, with the exception that the separate left and right electric power sources 104L,104R, and their respective separate functionalities are combined into a common electric power source 130, which has the functionality to individually control the left and right electrically powered linear actuators 42L,42R in response to the individual left and right stabilizer wheel position control signals 118L,118R provided by the common electronic control unit 100 of the embodiments shown in FIG. 13.

The invention may also take the form of a method for remotely positioning a stabilizer wheel arrangement 12 according to the invention, in an agricultural tillage implement 10 according to the invention. Such a method may include the steps of: operatively attaching a first end of an electrically powered linear actuator 42 to the support strut 28, and a second end of the electrically powered linear actuator 42 to the support strut bracket 24 for extension and retraction of the strut 28 with respect to the strut bracket 24 by corresponding extension and retraction of the electrically powered linear actuator 42 to thereby lower and raise the stabilizer wheel 46 in to, and out of contact with the ground surface 80; operatively connecting a position sensor 102 between the strut 28 and the strut bracket 24 for indicating a present linear position of the strut 28 with respect to the strut bracket 24, and generating an electrical signal 116 indicative of a present stabilizer wheel position with respect to the strut bracket 24; operatively connecting an electric power source 104 to the electrically powered linear actuator 42 for controlling extension and retraction of the electrically powered linear actuator 42 in response to an electrically powered linear actuator control electrical signal 118; and operatively connecting an electronic control unit 100 to the position sensor 102 and the electric power source 104 to receive the present position signal 116 and a desired stabilizer wheel position input 120, and to provide the actuator control electrical signal 118 to the electric power source 104, to thereby cause the electrically powered linear actuator 42 to move the stabilizer wheel 46 to, and hold the stabilizer wheel 46 at the desired stabilizer wheel position 120.

From the foregoing, it will be appreciated that the invention provides significant improvement over prior manual approaches to positioning single and multiple implement stabilizer wheels. The invention provides approaches to positioning stabilizer wheels that are far less cumbersome and time-consuming than prior approaches, eliminate the need for an operator's assistant on the ground, and substantially reduce the risk of adjustment error. Fluid leakage of prior hydraulically actuated approaches is eliminated, and cost is reduced by replacing more complex and expensive manual turnbuckles and hydraulic systems with simpler, lower cost and more reliable electrical components and connections.

The invention allows positioning of stabilizer wheels to be carried out remotely by an operator seated in the towing vehicle, without the need for the operator to dismount from the towing vehicle, and without having an assistant on the ground. The invention also allows the stabilizer wheels to be automatically, rather than manually, positioned in response to a simple command from an operator in the cab of the towing vehicle. Through practice of the invention, the stabilizer wheels can be automatically adjusted in response to changes in depth of tillage. The invention provides capability for accomplishing remote, automatic, and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position. The invention can readily utilize or be incorporated into existing modem implement control protocols, such as an ISOBUS.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

I claim:

1. A remotely positionable stabilizer wheel arrangement for an agricultural tillage implement having an implement frame supported above a ground surface by implement support wheels operatively connected to the frame by a depth control arrangement, the stabilizer wheel arrangement comprising:
    a support strut having a first end thereof adapted for mounting a stabilizer wheel thereto;
    a stabilizer wheel operatively attached to the first end of the strut and adapted for engaging the ground surface;
    a support strut bracket adapted for attachment to the implement frame and for slidable engagement with a second end of the support strut;
    an electrically powered linear actuator having a first end thereof operatively attached to the support strut, and a second end thereof operatively attached to the support strut bracket for extension and retraction of the strut with respect to the strut bracket by corresponding extension and retraction of the electrically powered linear actuator to thereby lower and raise the stabilizer wheel in to and out of contact with the ground surface;
    a position sensor operatively connected between the strut and the strut bracket for indicating a present linear position of the strut with respect to the strut bracket, and generating an electrical signal indicative of a present wheel position with respect to the strut bracket;
    an electric power source operatively connected to the electrically powered linear actuator for controlling extension and retraction of the electrically powered linear actuator in response to an electrically powered linear actuator control electrical signal; and
    an electronic control unit operatively connected to the position sensor and the electric power source to receive the present position signal and a desired stabilizer wheel position input, and configured for providing the electrically powered linear actuator control electrical signal to the electric power source, to thereby cause the electrically powered linear actuator to move the stabilizer wheel to, and hold the stabilizer wheel at the desired stabilizer wheel position.

2. The remotely positionable stabilizer wheel arrangement of claim 1, wherein the control unit selects a predetermined stabilizer wheel position corresponding to the desired stabilizer wheel position input and controls the electric power source using the predetermined stabilizer wheel position.

3. The remotely positionable stabilizer wheel arrangement of claim 1, wherein the control unit computes a computed desired stabilized wheel position corresponding to the desired stabilizer wheel position input and controls the electric power source using the computed desired stabilizer wheel position.

4. The remotely positionable stabilizer wheel arrangement of claim 3, wherein the desired stabilizer wheel input is an incremental adjustment to a previous desired stabilizer wheel position.

5. The remotely positionable stabilizer wheel arrangement of claim 1, wherein the electronic control unit is further configured for receiving a desired depth electrical signal, and for computing a computed desired position of the stabilizer wheel and providing an e actuator control signal corresponding to the computed desired position of the stabilized wheel to the electric power source, to thereby cause the electrically powered linear actuator to move the stabilizer wheel to, and hold the stabilizer wheel at the computed desired stabilizer wheel position.

6. The remotely positionable stabilizer wheel arrangement of claim 5, wherein the control unit selects a predetermined stabilizer wheel position corresponding to the desired depth electrical signal, and controls the electric power source using the selected predetermined stabilizer wheel position.

7. The remotely positionable stabilizer wheel arrangement of claim 5, wherein the control unit computes a computed desired stabilized wheel position corresponding to the desired depth input and controls the electric power source using the computed desired stabilizer wheel position.

8. The remotely positionable stabilizer wheel arrangement of claim 7, wherein the desired depth input is an incremental adjustment to a previous desired depth of penetration.

9. A towable agricultural tillage implement adapted attachment to a towing vehicle and having an implement frame supported above a ground surface by implement support wheels operatively connected to the frame by a depth control arrangement to thereby control a depth of penetration below the ground surface of tillage tools attached to the frame, and one or more stabilizer wheel arrangements attached to the frame in a manner providing selective stabilizing support of the implement, wherein each of the one or more remotely positionable stabilizer wheel arrangements comprises:
    a support strut having a first end thereof adapted for mounting a stabilizer wheel thereto;
    a stabilizer wheel operatively attached to the first end of the strut and adapted for engaging the ground surface;
    a support strut bracket adapted for attachment to the implement frame and for slidable engagement with a second end of the support strut;
    an electrically powered linear actuator having a first end thereof operatively attached to the support strut, and a second end thereof operatively attached to the support strut bracket for extension and retraction of the strut with respect to the strut bracket by corresponding extension and retraction of the electrically powered linear actuator to thereby lower and raise the stabilizer wheel in to and out of contact with the ground surface;

a position sensor operatively connected between the strut and the strut bracket for indicating a present linear position of the strut with respect to the strut bracket, and generating an electrical signal indicative of a present wheel position with respect to the strut bracket;

an electric power source operatively connected to the electrically powered linear actuator for controlling extension and retraction of the electrically powered linear actuator in response to an electrically powered linear actuator control electrical signal; and an electronic control unit operatively connected to the position sensor and the electric power source to receive the present position signal and a desired stabilizer wheel position input, and configured for providing the electrically powered linear actuator control electrical signal to the electric power source, to thereby cause the electrically powered linear actuator to move the stabilizer wheel to, and hold the stabilizer wheel at the desired stabilizer wheel position.

10. The agricultural tillage implement of claim 9, wherein the implement includes a plurality of stabilizer wheel arrangements attached to the frame, and operatively connected to a common electronic control unit to be controlled thereby.

11. The agricultural tillage implement of claim 10, wherein the implement includes a plurality of stabilizer wheel arrangements attached to the frame, and operatively connected to a common electronic control unit to be individually controlled thereby.

12. The agricultural tillage implement of claim 10, wherein the implement includes a plurality of stabilizer wheel arrangements attached to the frame, and operatively connected to a common electronic control unit to be collectively controlled thereby.

13. The agricultural tillage implement of claim 10, wherein the implement includes a plurality of stabilizer wheel arrangements attached to the frame, and operatively connected to a common electronic control unit and a common electric power source to be collectively controlled thereby.

14. The agricultural tillage implement of claim 10, wherein the implement includes a plurality of stabilizer wheel arrangements attached to the frame, and operatively connected to a common electronic control unit and a common electric power source to be collectively controlled thereby.

15. The agricultural tillage implement of claim 10, wherein:
the tillage implement further includes a depth sensor indicating a depth of penetration of the tillage tools below the ground surface and providing an electrical signal indicative of the present depth of penetration; and for each of the one or more stabilizer wheel arrangements, the electronic control unit is further configured for receiving the present depth electrical signal, and for computing a computed desired position of the stabilizer wheel and providing an actuator control signal corresponding to the computed desired position of each of the one or more stabilizer wheels to the respective electric power source, to thereby cause the electrically powered linear actuator of the respective stabilizer wheel arrangements to move the respective stabilizer wheel to, and hold the respective stabilizer wheel at the computed desired stabilizer wheel position.

16. The remotely positionable stabilizer wheel arrangement of claim 14, wherein the implement includes a plurality of stabilizer wheel arrangements attached to the frame, and operatively connected to a common electronic control unit to be individually controlled thereby.

17. The remotely positionable stabilizer wheel arrangement of claim 14, wherein the implement includes a plurality of stabilizer wheel arrangements attached to the frame, and operatively connected to a common electronic control unit and a common electric power source to be collectively controlled thereby.

18. A method for remotely positioning a stabilizer wheel arrangement for an agricultural tillage implement having an implement frame supported above a ground surface by implement support wheels operatively connected to the frame by a depth control arrangement, wherein the stabilizer wheel arrangement includes a support strut having a first end thereof adapted for mounting a stabilizer wheel thereto, a stabilizer wheel operatively attached to the first end of the strut and adapted for engaging the ground surface, and a support strut bracket attached to the implement frame and for slidable engagement with a second end of the support strut, the method comprising:

operatively attaching a first end of an electrically powered linear actuator to the support strut, and a second end thereof to the support strut bracket for extension and retraction of the strut with respect to the strut bracket by corresponding extension and retraction of the electrically powered linear actuator to thereby lower and raise the stabilizer wheel in to and out of contact with the ground surface;

operatively connecting a position sensor between the strut and the strut bracket for indicating a present linear position of the strut with respect to the strut bracket, and generating an electrical signal indicative of a present stabilizer wheel position with respect to the strut bracket;

operatively connecting an electric power source to the electrically powered linear actuator for controlling extension and retraction of the electrically powered linear actuator in response to an electrically powered linear actuator control electrical signal; and operatively connecting an electronic control unit to the position sensor and the electric power source to receive the present position signal and a desired stabilizer wheel position input, and to provide the electrically powered linear actuator control electrical signal to the electric power source, to thereby cause the electrically powered linear actuator to move the stabilizer wheel to, and hold the stabilizer wheel at the desired stabilizer wheel position.

19. The method for remotely positioning a stabilizer wheel arrangement of claim 18, wherein the implement includes a plurality of remotely positionable stabilizer wheel arrangements attached to the frame, and the method further includes, operatively connecting the plurality of stabilizer wheel arrangements to a common electronic control unit to be collectively controlled thereby.

20. The method for remotely positioning a stabilizer wheel arrangement of claim 18, wherein the implement includes a plurality of remotely positionable stabilizer wheel arrangements attached to the frame, and the method further includes, operatively connecting the plurality of stabilizer wheel arrangements to a common electronic control unit to be individually controlled thereby.

* * * * *